(12) United States Patent
Nozu et al.

(10) Patent No.: US 10,293,687 B2
(45) Date of Patent: May 21, 2019

(54) FOUR-WHEEL DRIVE VEHICLE AND CONTROL APPARATUS FOR FOUR-WHEEL DRIVE VEHICLE

(71) Applicant: JTEKT CORPORATION, Osaka-shi (JP)

(72) Inventors: Tomohiro Nozu, Anjo (JP); Go Nagayama, Toyama (JP); Shotaro Niimi, Kariya (JP); Akiyoshi Kakita, Toyota (JP); Kotaro Sarai, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 35 days.

(21) Appl. No.: 15/725,400

(22) Filed: Oct. 5, 2017

(65) Prior Publication Data

US 2018/0099563 A1  Apr. 12, 2018

(30) Foreign Application Priority Data

Oct. 11, 2016 (JP) .................. 2016-200258

(51) Int. Cl.
*B60K 23/08* (2006.01)
*B60K 17/02* (2006.01)
(Continued)

(52) U.S. Cl.
CPC ............ *B60K 23/08* (2013.01); *B60K 17/02* (2013.01); *B60K 17/344* (2013.01); *B60K 17/348* (2013.01); *B60K 17/3515* (2013.01); *B60K 23/0808* (2013.01); *F16D 11/14* (2013.01); *F16D 13/52* (2013.01); *F16D 25/061* (2013.01); *F16D 27/118* (2013.01); *F16D 48/06* (2013.01); *B60K 2023/0858* (2013.01);
(Continued)

(58) Field of Classification Search
None
See application file for complete search history.

(56) References Cited

U.S. PATENT DOCUMENTS 5,492,194 A * 2/1996 McGinn ............... B60K 17/344
                                                180/233
6,834,225 B1 * 12/2004 Jiang .................... B60K 17/35
                                                180/197

(Continued)

FOREIGN PATENT DOCUMENTS

JP    2009-269605    11/2009
JP    2013-164099     8/2013

*Primary Examiner* — Colby M Hansen
(74) *Attorney, Agent, or Firm* — Oblon, McClelland, Maier & Neustadt, L.L.P.

(57) ABSTRACT

A control apparatus for a four-wheel drive vehicle includes a current detector configured to output a detection signal in accordance with the magnitude of an actual control current, a target current value calculator configured to calculate a target current value that is a target value of the control current, and a current controller configured to control a current output circuit to output the control current having the target current value calculated by the target current value calculator based on a result of detection performed by the current detector. When the four-wheel drive vehicle is in a two-wheel drive mode in which first and second friction clutches are released, the current controller performs zero-point adjustment for adjusting a zero point of the control current to be output from the current output circuit.

7 Claims, 10 Drawing Sheets

(51) Int. Cl.
*F16D 11/14* (2006.01)
*F16D 13/52* (2006.01)
*B60K 17/348* (2006.01)
*F16D 25/061* (2006.01)
*F16D 27/118* (2006.01)
*F16D 48/06* (2006.01)
*B60K 17/344* (2006.01)
*B60K 17/35* (2006.01)

(52) U.S. Cl.
CPC . *B60K 2023/0866* (2013.01); *B60Y 2400/421* (2013.01); *B60Y 2400/424* (2013.01); *F16D 2500/1045* (2013.01); *F16D 2500/10431* (2013.01); *F16D 2500/10462* (2013.01)

(56) References Cited

U.S. PATENT DOCUMENTS

2005/0266950 A1* 12/2005 Bowen .................. B60K 23/04
                                                            475/198
2009/0277711 A1    11/2009 Hoffmann et al.

* cited by examiner

FOUR-WHEEL DRIVE VEHICLE AND CONTROL APPARATUS FOR FOUR-WHEEL DRIVE VEHICLE

INCORPORATION BY REFERENCE

The disclosure of Japanese Patent Application No. 2016-200258 filed on Oct. 11, 2016 including the specification, drawings and abstract, incorporated herein by reference in its entirety.

BACKGROUND OF THE INVENTION

1. Field of the Invention

The present invention relates to a four-wheel drive vehicle including main driving wheels to which a driving force of a drive source is constantly transmitted, and auxiliary driving wheels to which the driving force is transmitted in a disconnectable manner. The present invention also relates to a control apparatus for the four-wheel drive vehicle.

2. Description of the Related Art

Hitherto, there is known a four-wheel drive vehicle including main driving wheels to which a driving force of a drive source is constantly transmitted, a driving shaft configured to transmit the driving force in a fore-and-aft direction of the vehicle, auxiliary driving wheels to which the driving force of the drive source is transmitted via the driving shaft, a dog clutch and a friction clutch provided such that the driving shaft is interposed therebetween in a driving force transmission path to the auxiliary driving wheels, and a control apparatus configured to control the dog clutch and the friction clutch (see, for example, Japanese Patent Application Publication No. 2013-164099) (JP 2013-164099 A) and Japanese Patent Application Publication No. 2009-269605 (JP 2009-269605 A)).

When the four-wheel drive vehicle constructed as described above travels in a two-wheel drive mode in which the driving force is transmitted only to the main driving wheels, rotation of the driving shaft can be stopped by interrupting the transmission of the driving force that is performed by both of the dog clutch and the friction clutch. Therefore, a traveling resistance caused along with the rotation of the driving shaft can be reduced, whereby the fuel efficiency can be improved. When the four-wheel drive vehicle travels in a four-wheel drive mode in which the driving force is transmitted to the main driving wheels and the auxiliary driving wheels, the dog clutch is brought into meshing engagement, and the friction clutch is electrically controlled to regulate the driving force to be transmitted to the auxiliary driving wheels.

In the four-wheel drive vehicle described in JP 2013-164099 A, a connection/disconnection unit 415 on the front wheel side in FIG. 1 corresponds to the dog clutch, a propeller shaft 419 corresponds to the driving shaft, and a connection/disconnection unit 31 on the rear wheel side corresponds to the friction clutch. In the four-wheel drive vehicle described in JP 2009-269605 A, a switch-on device 3 on the front wheel side in FIG. 3 or the like corresponds to the dog clutch, an intermediate shaft 11 corresponds to the driving shaft, and a half shaft clutch 4 corresponds to the friction clutch.

When the four-wheel drive vehicle constructed as described above travels in the four-wheel drive mode, the control apparatus determines the driving force to be transmitted to the auxiliary driving wheels based on, for example, a difference between rotation speeds of the front and rear wheels and a depression amount of an accelerator pedal, and outputs a current to the friction clutch in accordance with the driving force. The current is required to have high accuracy, and therefore the control apparatus detects an actual current that is actually output to the friction clutch, and performs feedback control so that the current value of the actual current is a value in accordance with the driving force to be transmitted to the auxiliary driving wheels. For example, when a sensor unit configured to detect a current and an amplifier circuit configured to amplify a signal output from the sensor unit have an offset in their characteristics due to changes over time or temperature, however, an error occurs in the current output from the control apparatus to the friction clutch even when the feedback control is performed. As a result, the friction clutch cannot be controlled accurately.

SUMMARY OF THE INVENTION

It is one object of the present invention to provide a four-wheel drive vehicle including a dog clutch and a friction clutch provided such that a driving shaft is interposed therebetween in a driving force transmission path to auxiliary driving wheels, and a control apparatus configured to control the dog clutch and the friction clutch, in which the accuracy of a current to be output from the control apparatus in order to control the friction clutch can be increased.

A four-wheel drive vehicle according to one aspect of the present invention includes:

main driving wheels to which a driving force of a drive source is constantly transmitted;

a driving shaft configured to transmit the driving force in a fore-and-aft direction of the vehicle;

auxiliary driving wheels to which the driving force of the drive source is transmitted via the driving shaft;

a first driving force transmission apparatus and a second driving force transmission apparatus arranged such that the driving shaft is interposed between the first driving force transmission apparatus and the second driving force transmission apparatus in a driving force transmission path to the auxiliary driving wheels; and a control apparatus configured to control the first driving force transmission apparatus and the second driving force transmission apparatus.

The first driving force transmission apparatus includes a dog clutch configured to transmit the driving force through engagement between projections and recesses.

The second driving force transmission apparatus includes an outer rotational member and an inner rotational member that are supported so as to be coaxially rotatable relative to each other, an outer clutch plate configured to rotate together with the outer rotational member, an inner clutch plate configured to rotate together with the inner rotational member, and a pressing mechanism configured to press the outer clutch plate and the inner clutch plate in an axial direction by a pressing force in accordance with a control current supplied from the control apparatus.

The control apparatus includes a current output circuit configured to output the control current to the pressing mechanism, a current detector configured to output a detection signal in accordance with a magnitude of the control current that is actually output from the current output circuit, a target current value calculator configured to calculate a target current value that is a target value of the control current to be supplied to the pressing mechanism, and a current controller configured to control the current output circuit so that the control current having the current value calculated by the target current value calculator based on a result of detection performed by the current detector is output to the pressing mechanism. When the four-wheel drive vehicle is in a two-wheel drive mode in which transmission of the driving force that is performed by both the first driving force transmission apparatus and the second driving force transmission apparatus is interrupted, the current controller is configured to perform zero-point adjustment for storing information that the detection signal output from the current detector indicates a zero point of the control current to be output from the current output circuit.

According to the four-wheel drive vehicle of the aspect described above, it is possible to increase the accuracy of the current to be output from the control apparatus in order to control the friction clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention is described with reference to FIG. 1 to FIG. 7.

Figure 1:
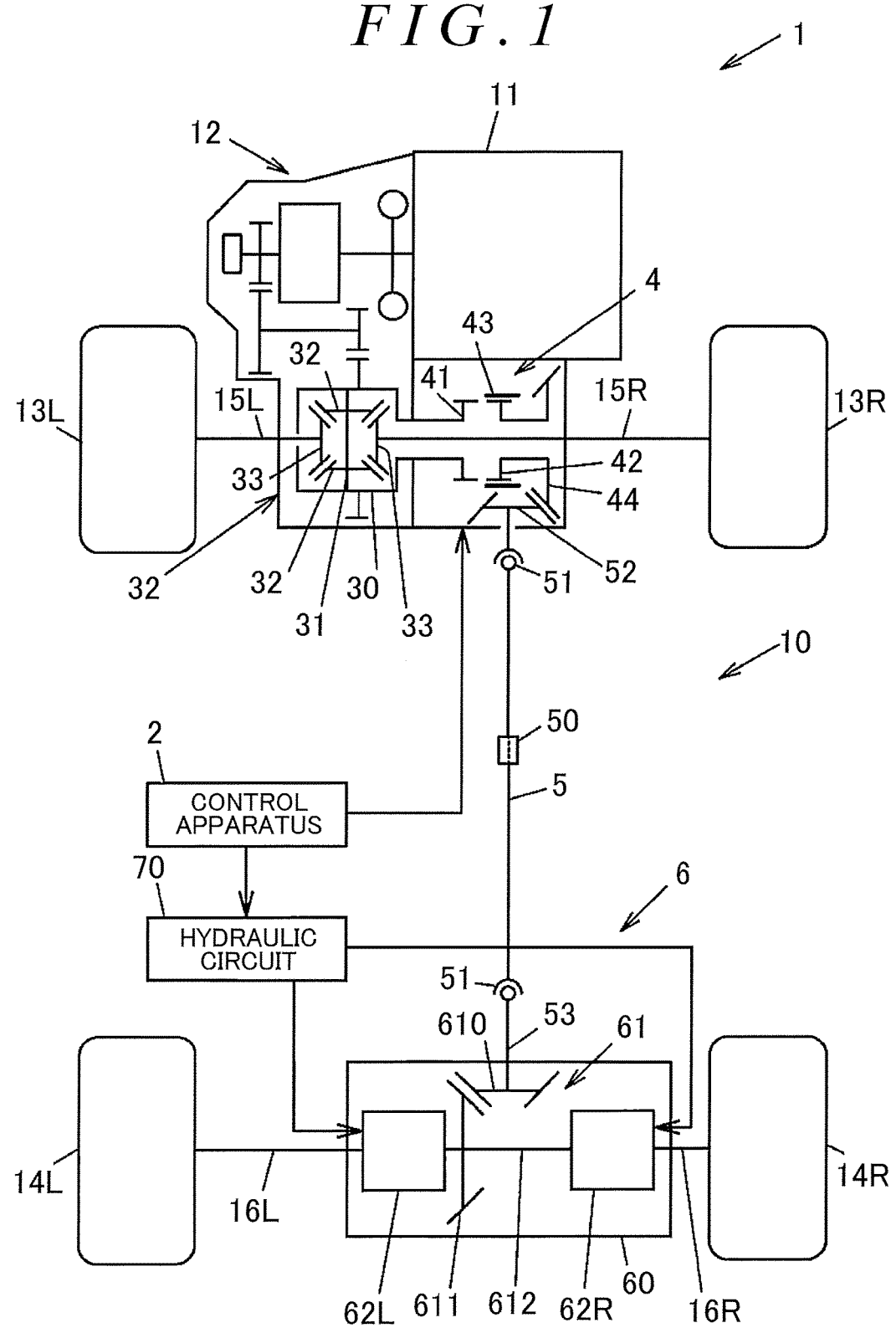
FIG. 1 is a structural diagram illustrating the schematic structure of a four-wheel drive vehicle according to a first embodiment of the present invention.

FIG. 1 is a structural diagram illustrating the schematic structure of a four-wheel drive vehicle according to the first embodiment of the present invention.

A four-wheel drive vehicle 1 includes an engine 11 serving as a drive source configured to generate a driving force for traveling, a transmission 12 configured to vary the speed of rotation output from the engine 11, front wheels 13R and 13L serving as a pair of right and left main driving wheels, rear wheels 14R and 14L serving as a pair of right and left auxiliary driving wheels, a driving force transmission system 10 capable of transmitting the driving force of the engine 11, which is obtained through the speed variation performed by the transmission 12, to the front wheels 13R and 13L and the rear wheels 14R and 14L, and a control apparatus 2. In this embodiment, the suffixes "R" and "L" of the reference symbols are used to present "right" and "left" with respect to a forward traveling direction of the vehicle.

The four-wheel drive vehicle 1 is switchable between a four-wheel drive mode in which the driving force of the engine 11 is transmitted to the front wheels 13R and 13L and the rear wheels 14R and 14L and a two-wheel drive mode in which the driving force of the engine 11 is transmitted only to the front wheels 13R and 13L. The driving force of the engine 11 is constantly transmitted to the front wheels 13R and 13L, and is transmitted to the rear wheels 14R and 14L in response to traveling conditions or driver's switching operations.

In this embodiment, description is given of a case where an internal combustion engine is applied as the source, but the present invention is not limited thereto. The drive source may be constituted by a combination of an engine and a high-power electric motor such as an interior permanent magnet synchronous (IPM) motor, or by a high-power electric motor alone.

The driving force transmission system 10 constitutes a driving force transmission path ranging from the transmission 12 of the four-wheel drive vehicle 1 to each of the front wheels 13R and 13L and the rear wheels 14R and 14L. The driving force transmission system 10 includes a front differential 3, drive shafts 15R and 15L arranged between the front differential 3 and the front wheels 13R and 13L, a first driving force transmission apparatus 4 arranged adjacent to the front differential 3, a propeller shaft 5 serving as a driving shaft configured to transmit the driving force of the engine 11 in a fore-and-aft direction of the vehicle, a second driving force transmission apparatus 6 arranged behind the propeller shaft 5 in the fore-and-aft direction of the vehicle, and drive shafts 16R and 16L arranged between the second driving force transmission apparatus 6 and the rear wheels 14R and 14L.

The control apparatus 2 controls the first driving force transmission apparatus 4 and the second driving force transmission apparatus 6. The first driving force transmission apparatus 4 and the second driving force transmission apparatus 6 are arranged such that the propeller shaft 5 is interposed therebetween in the driving force transmission path to the rear wheels 14R and 14L. The driving force of the engine 11 is transmitted to the rear wheels 14R and 14L via the propeller shaft 5. With this structure, when the four-wheel drive vehicle 1 travels in the two-wheel drive mode, the control apparatus 2 controls the first driving force transmission apparatus 4 and the second driving force transmission apparatus 6 to interrupt the transmission of the driving force. Therefore, the propeller shaft 5 can be brought into a non-rotating state. Thus, a traveling resistance caused along with the rotation of the propeller shaft 5 is reduced, whereby the fuel efficiency is improved. The two wheel drive mode in which the transmission of the driving force that is performed by both of the first driving force transmission apparatus 4 and the second driving force transmission apparatus 6 is interrupted is hereinafter referred to as a disconnected mode of the driving force transmission system 10.

The front differential 3 includes a front differential case 30, a pinion shaft 31 configured to rotate together with the front differential case 30, a pair of pinion gears 32 rotatably supported by the pinion shaft 31, and a pair of side gears 33 meshing with the pinion gears 32 with their gear shafts set orthogonal to each other. The front differential 3 is arranged between the transmission 12 and the first driving force transmission apparatus 4. The drive shafts 15R and 15L are coupled to the side gears 33, respectively.

The propeller shaft 5 is constituted by a plurality of shaft members that are coupled to each other by a plurality of universal joints 51 having joint spiders. A drive pinion 52 is provided at the end of the propeller shaft 5 on the front side of the vehicle, and a coupling portion 53 is provided at the end of the propeller shaft 5 on the rear side of the vehicle. The coupling portion 53 is coupled to a coupling member 600 (described later) of the second driving force transmission apparatus 6 so as not to be rotatable relative to the coupling member 600. The center of the propeller shaft 5 in its longitudinal direction is supported by a center bearing 50 so as to be rotatable relative to a vehicle body.

Figure 2A:
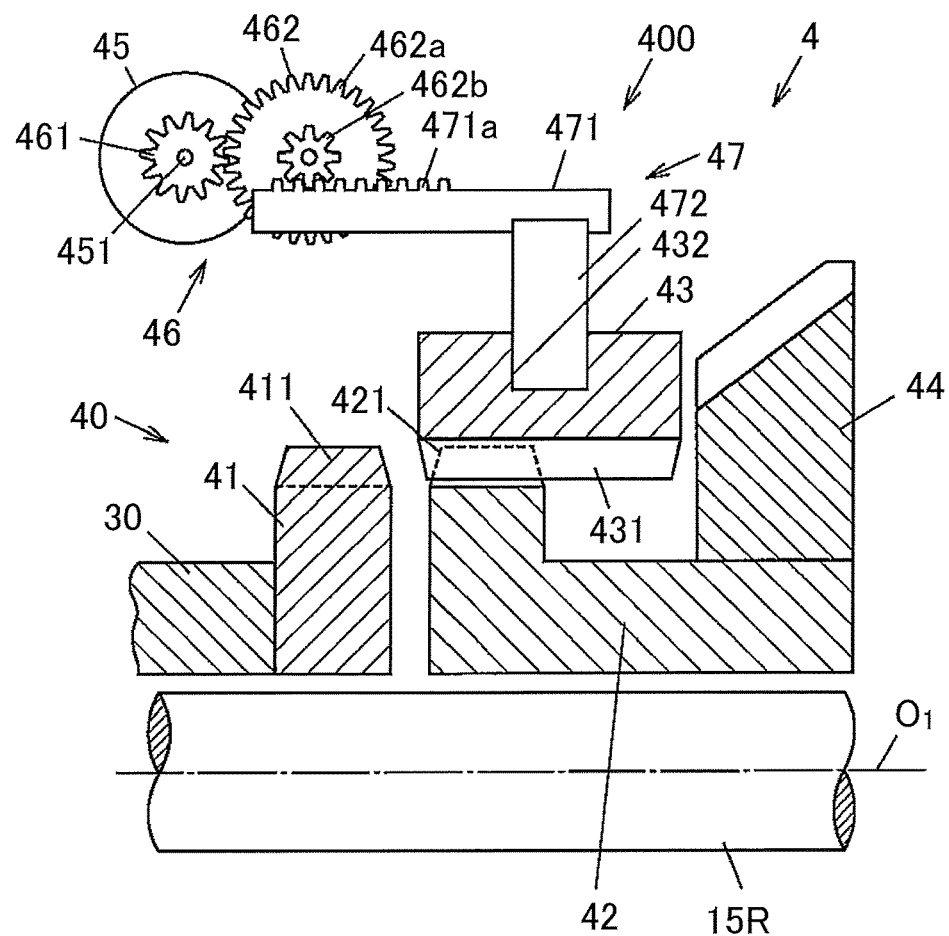
FIG. 2A is a sectional view illustrating an example of the structure of a first driving force transmission apparatus.
Figure 2B:
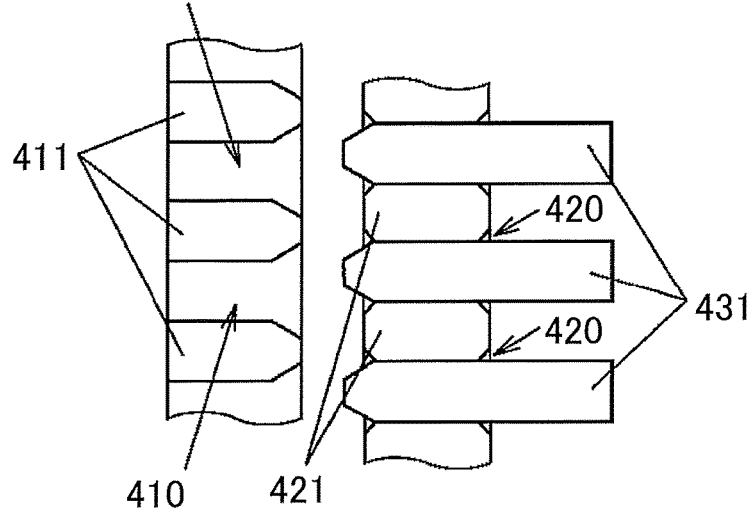
FIG. 2B is an explanatory view schematically illustrating a meshing engagement portion of the first driving force transmission apparatus in the example of the structure of the first driving force transmission apparatus.

FIG. 2A is a sectional view illustrating an example of the structure of the first driving force transmission apparatus 4. FIG. 2B is an explanatory view schematically illustrating a meshing engagement portion of the first driving force transmission apparatus 4 in the example of the structure of the first driving force transmission apparatus 4. FIG. 2A illustrates an upper half range of the first driving force transmission apparatus 4 with respect to a rotation axis $O_1$ of the front differential case 30.

The first driving force transmission apparatus 4 includes a dog clutch 40 configured to transmit the driving force through engagement between projections and recesses. More specifically, the first driving force transmission apparatus 4 includes a dog clutch 40 constituted by first to third rotational members 41 to 43 configured to rotate coaxially with the front differential case 30, an actuator 400 configured to actuate the dog clutch 40, and a ring gear 44 meshing with the drive pinion 52 of the propeller shaft 5 with their gear shafts set orthogonal to each other.

The actuator 400 includes an electric motor 45, a speed reducing mechanism 46 configured to reduce the speed of rotation of an output shaft 451 of the electric motor 45, and a movement mechanism 47 configured to move the third rotational member 43 of the dog clutch 40 in its axial direction by a torque of the electric motor 45 that is obtained through the speed reduction performed by the speed reducing mechanism 46. The electric motor 45 is operated by a current supplied from the control apparatus 2.

The first rotational member 41 is fixed to the axial end of the front differential case 30, and rotates together with the front differential case 30. The second rotational member 42 is coaxially rotatable relative to the first rotational member 41. The third rotational member 43 is provided on an outer peripheral side of the second rotational member 42 to have a cylindrical shape, and is axially movable relative to the second rotational member 42.

The first rotational member 41 has an annular shape such that the drive shaft 15 on the right front wheel side is inserted through an inner peripheral side of the first rotational member 41. The first rotational member 41 has a plurality of spline teeth 411 that are formed on its outer peripheral surface so as to extend parallel to the rotation axis $O_1$. Recesses 410 are each formed between a pair of spline teeth 411 adjacent to each other in a circumferential direction out of the plurality of spline teeth 411. The second rotational member 42 has a tubular shape such that the drive shaft 15R is inserted through the second rotational member 42. The ring gear 44 is fixed to one axial end of the second rotational member 42. The second rotational member 42 has a plurality of spline teeth 421 that are formed on its outer peripheral surface so as to extend parallel to the rotation axis $O_1$. Recesses 420 are each formed between a pair of spline teeth 421 adjacent to each other in the circumferential direction out of the plurality of spline teeth 421.

A plurality of spline teeth 431 are formed on the inner peripheral surface of the third rotational member 43. The spline teeth 431 are engageable with the spline teeth 411 of the first rotational member 41 and the spline teeth 421 of the second rotational member 42. In this embodiment, the spline teeth 431 of the third rotational member 43 mesh with the recesses 420 of the second rotational member 42, and the third rotational member 43 is axially movable relative to the second rotational member 42 while keeping the meshing state.

When the third rotational member 43 is moved toward the first rotational member 41 by the movement mechanism 47, the spline teeth 431 of the third rotational member 43 serving as the projections mesh with the recesses 410 of the first rotational member 41, and therefore the third rotational member 43 is coupled to the first rotational member 41 so as not to be rotatable relative to the first rotational member 41. Thus, the first rotational member 41 and the second rotational member 42 are coupled to each other via the third rotational member 43 so as not to be rotatable relative to each other, thereby achieving a state in which the driving force of the engine 11 is transmissible from the first rotational member 41 to the second rotational member 42. When the third rotational member 43 is moved away from the first rotational member 41, the spline teeth 431 of the third rotational member 43 are unmeshed from the recesses 410 of the first rotational member 41, and therefore the first rotational member 41 and the second rotational member 42 are rotatable relative to each other. Thus, the transmission of the driving force from the first rotational member 41 to the second rotational member 42 is interrupted.

The speed reducing mechanism 46 includes a pinion gear 461 configured to rotate together with the output shaft 451 of the electric motor 45, and a speed reducing gear 462 having a large-diameter gear portion 462a meshing with the pinion gear 461 and a small-diameter gear portion 462b configured to rotate together with the large-diameter gear portion 462a. The movement mechanism 47 includes a linear motion shaft 471 having rack teeth 471a meshing with the small-diameter gear portion 462b of the speed reducing gear 462, and a shift fork 472 fixed to the linear motion shaft 471. The third rotational member 43 has an annular groove 432 formed on its outer peripheral surface. The shift fork 472 is slidably fitted to the annular groove 432.

When the output shaft 451 of the electric motor 45 rotates, the speed of rotation of the output shaft 451 is reduced by the speed reducing mechanism 46, and the linear motion shaft 471 moves parallel to the rotation axis $O_1$. Along with the movement of the linear motion shaft 471, the third rotational member 43 moves between a coupled position where the third rotational member 43 meshes with the first rotational member 41 and the second rotational member 42 and a decoupled position where the third rotational member 43 does not mesh with the first rotational member 41.

As illustrated in FIG. 1, the second driving force transmission apparatus 6 includes a housing 60 supported by the vehicle body, a gear mechanism 61 on the rear wheel side, to which the driving force is transmitted from the propeller shaft 5, first and second friction clutches 62R, and 62L configured to regulate the driving force transmitted by the gear mechanism 61 and transmit the driving force to the drive shafts 16R and 16L on the rear wheel side, respectively, and a hydraulic circuit 70 configured to supply a hydraulic pressure to each of the first and second friction clutches 62R and 62L. The housing 60 houses the first and second friction clutches 62R and 62L and the gear mechanism 61.

The gear mechanism 61 includes a pinion gear 610 and a ring gear 611 meshing with each other with their gear shafts set orthogonal to each other, and a center shaft 612 configured to rotate together with the ring gear 611. The center shaft 612 has its rotation axis parallel to a vehicle width direction, and rotates by receiving a rotational force of the propeller shaft 5 via the ring gear 611. The first friction clutch 62R is arranged between the center shaft 612 and the drive shaft 16R on the rear wheel side, and the second friction clutch 62L is arranged between the center shaft 612 and the drive shaft 16L on the rear wheel side.

When the four-wheel drive vehicle 1 is switched from the two-wheel drive mode to the four-wheel drive mode while traveling, the control apparatus 2 causes the propeller shaft 5 to rotate by transmitting rotational forces of the rear wheels 14R and 14L to the propeller shaft 5 via the second driving force transmission apparatus 6, thereby synchronizing the rotation of the first rotational member 41 of the first driving force transmission apparatus 4 with the rotation of the second rotational member 42 of the first driving force transmission apparatus 4. After the rotational synchronization is completed, the actuator 400 of the first driving force transmission apparatus 4 is controlled so that the third rotational member 43 meshes with the first rotational member 41. In this manner, the four-wheel drive vehicle 1 is switched to the four-wheel drive mode.

Figure 3:
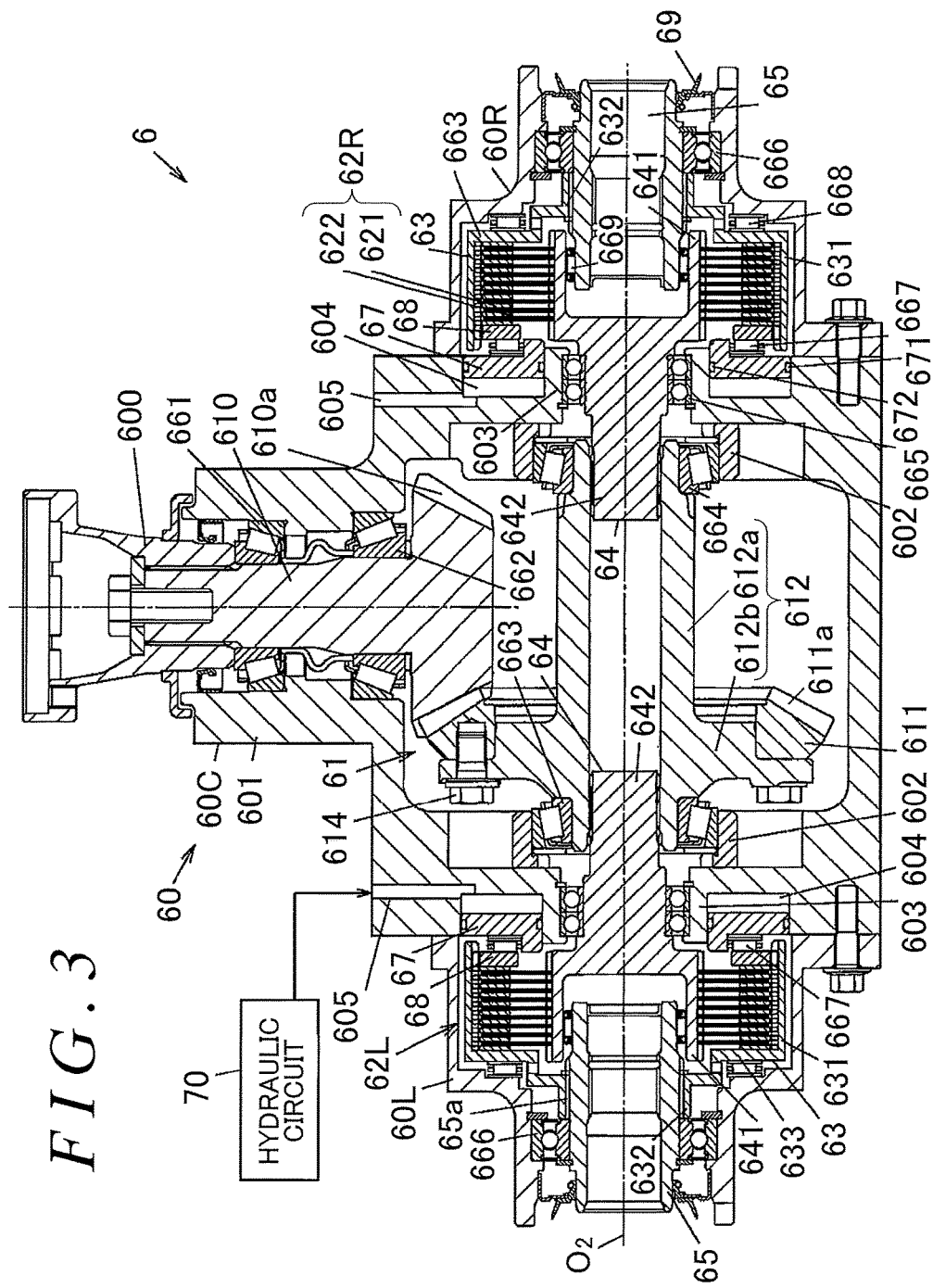
FIG. 3 is a sectional view illustrating a specific example of the structure of a second driving force transmission apparatus.
Figure 4:
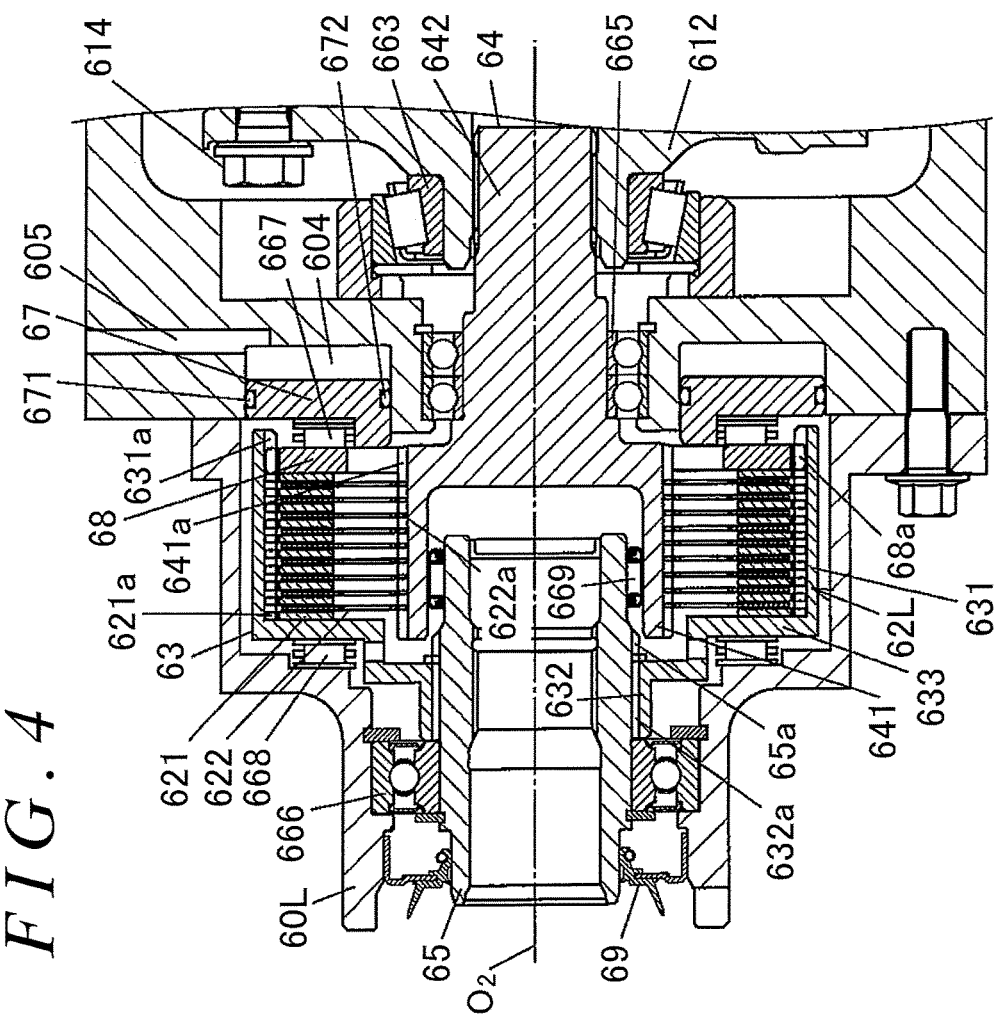
FIG. 4 is a main part sectional view illustrating the structure of a first friction clutch and its periphery.

FIG. 3 is a sectional view illustrating a specific example of the structure of the second driving force transmission apparatus 6. FIG. 4 is a main part sectional view illustrating the structure of the first friction clutch 62L and its periphery.

In the second driving force transmission apparatus 6, the pinion gear 610 of the gear mechanism 61 is coupled to the coupling portion 53 of the propeller shaft 5 (see FIG. 1) by the coupling member 600 so as not to be rotatable relative to the coupling portion 53. The second driving force transmission apparatus 6 includes clutch drums 63, inner shafts 64, a pair of right and left coupling shafts 65, various bearings 661 to 669, pistons 67, and pressing members 68. The clutch drums 63 serve as a pair of right and left outer rotational members that house the first and second friction clutches 62R and 62L, respectively. The inner shafts 64 serve as a pair of right and left inner rotational members that are arranged on an inner side of the clutch drums 63, respectively. The coupling shafts 65 respectively couple the clutch drums 63 and the drive shafts 16R and 16L on the rear wheel side to each other so that the clutch drums 63 and the drive shafts 16R and 16L are not rotatable relative to each other. The clutch drum 63 and the inner shaft 64 are supported so as to be coaxially rotatable relative to each other.

The housing 60 includes a center housing member 60C that houses the pinion gear 610, the ring gear 611, and the center shaft 612 of the gear mechanism 61, and side housing members 60R and 60L that house the first and second friction clutches 62R and 62L, respectively. The center housing member 60C is arranged between the side housing member 60R arranged on the right side in the vehicle width direction and the side housing member 60L arranged on the left side in the vehicle width direction. The center housing member 60C and the side housing members 60R and 60L are fixed to each other by bolt fastening. The housing 60 is filled with lubricating oil (not illustrated) for lubricating a mesh between gears of the gear mechanism 61 and a frictional slide of each of the first and second friction clutches 62R and 62L.

The center housing member 60C includes a first retaining portion 601 that rotatably retains the pinion gear 610 of the gear mechanism 61 via the tapered roller bearings 661 and 662, a second retaining portion 602 that rotatably retains the center shaft 612 of the gear mechanism 61 via the pair of tapered roller bearings 663 and 664, a third retaining portion 603 that rotatably retains the pair of right and left inner shafts 64 via the ball bearings 665, respectively, and cylinder chambers 604 that respectively house parts of the pistons 67 so that the pistons 67 are advanceable and withdrawable inside. The cylinder chambers 604 are formed at both ends of the center housing member 60C in the vehicle width direction., and are open toward the side housing members 60R and 60L. The coupling shafts 65 are supported on the side housing members 60R and 60L by the ball bearings 666.

The center shaft 612 integrally has a cylindrical portion 612a extending along a rotation axis $O_2$ of the center shaft 612, and a flange portion 612b formed at the end of the cylindrical portion 612a so as to protrude radially outward. A plurality of meshing teeth 611a are formed on the ring gear 611. The meshing teeth 611a mesh with a gear portion 610a of the pinion gear 610. The ring gear 611 is fixed to the flange portion 612b of the center shaft 612 with bolts 614.

Each of the first and second friction clutches 62R and 62L includes a plurality of outer clutch plates 621 engaging with the clutch drum 63 so as to be axially movable but not rotatable relative to the clutch drum 63, and a plurality of inner clutch plates 622 engaging with the inner shaft 64 so as to be axially movable but not rotatable relative to the inner shaft 64. The outer clutch plates 621 and the inner clutch plates 622 are alternately arranged in a direction parallel to the rotation axis $O_2$ of the center shaft 612, and are pressed by the piston 67. That is, each of the first and second friction clutches 62R and 62L generates a frictional force between the outer clutch plates 621 and the inner clutch plates 622 by receiving a pressing force from the piston 67.

The piston 67 presses the outer clutch plates 621 and the inner clutch plates 622 by receiving a hydraulic pressure of hydraulic oil supplied from the hydraulic circuit 70 to the cylinder chamber 604. The center housing member 60C is provided with a supply flow path 605 for introducing the hydraulic oil supplied from the hydraulic circuit 70 into the cylinder chamber 604. Annular seal members 671 and 672 are arranged on the outer peripheral surface and the inner peripheral surface of the piston 67, respectively.

Each of the first and second friction clutches 62R and 62L transmits the rotational force between the shaft 64 and the clutch drum 63 such that the outer clutch plates 621 and the inner clutch plates 622 are brought into frictional contact with each other by receiving, via the needle roller bearing 667 and the pressing member 68, the pressing force of the piston 67 that receives the pressure of the hydraulic oil. Thus, the driving force of the engine 11 is transmitted to the rear wheels 14R and 14L via the first and second friction clutches 62R and 62L, respectively. The pressing member 68 rotates together with the clutch drum 63, and the needle roller bearing 667 is arranged between the piston 67 and the pressing member 68.

In each of the first and second friction clutches 62R and 62L, the outer clutch plates 621 and the inner clutch plates 622 are freely rotatable relative to each other when the piston 67 does not receive the pressure of the hydraulic oil. Thus, the first and second friction clutches 62R and 62L can interrupt the transmission of the driving force from the engine 11 to the rear wheels 14R and 14L, respectively.

The clutch drum 63 integrally has a large-diameter cylindrical portion 631, a small-diameter cylindrical portion 632, and a side wall portion 633 between the large-diameter cylindrical portion 631 and the small-diameter cylindrical portion 632. As illustrated in FIG. 4, the outer clutch plates 621 have spline protrusions 621a on their outer peripheral portions. The spline protrusions 621a engage with straight spline fitting portions 631a formed on the inner peripheral surface of the large-diameter cylindrical portion 631 of the clutch drum 63. Thus, the outer clutch plates 621 rotate together with the clutch drum 63. The needle roller thrust bearing 668 is arranged between the side wall portion 633 of the clutch drum 63 and each of the side housing members 60R and 60L.

The pressing member 68 is a plate member having a circular ring shape, and has spline protrusions 68a on its outer peripheral portion. The spline protrusions 68a engage with the straight spline fitting portions 631a of the clutch drum 63. Through the engagement between the spline protrusions 68a and the straight spline fitting portions 631a, the pressing member 68 is coupled to the clutch drum 63 so as to be axially movable but not rotatable relative to the clutch drum 63.

Spline fitting portions 632a are formed on the inner peripheral surface of the small-diameter cylindrical portion 632 of the clutch drum 63. The spline fitting portions 632a are spline-fitted to spline fitting portions 65a formed on the outer peripheral surface of the coupling shaft 65. Thus, the clutch drum 63 is coupled to the coupling shaft 65 so as not to be rotatable relative to the coupling shaft 65.

The inner shaft 64 has a cylindrical portion 641 and a columnar shaft portion 642. The cylindrical portion 641 houses one end of the coupling shaft 65. The distal end of the shaft portion 642 is coupled to the center shaft 612 by spline fitting so that the inner shaft 64 is not rotatable relative to the center shaft 612. The needle roller bearing 669 is arranged between the inner peripheral surface of the cylindrical portion 641 and the outer peripheral surface of the coupling shaft 65. A seal member 69 is arranged between the open inner surface of each of the side housing members 60R and 60L at the end in the vehicle width direction and the outer peripheral surface of the coupling shaft 65.

The inner clutch plates 622 have spline protrusions 622a on their inner peripheral portions. The spline protrusions 622a engage with straight spline fitting portions 641a formed on the outer peripheral surface of the cylindrical portion 641 of the inner shaft 64. Thus, the inner clutch plates 622 rotate together with the inner shaft 64.

Figure 5:
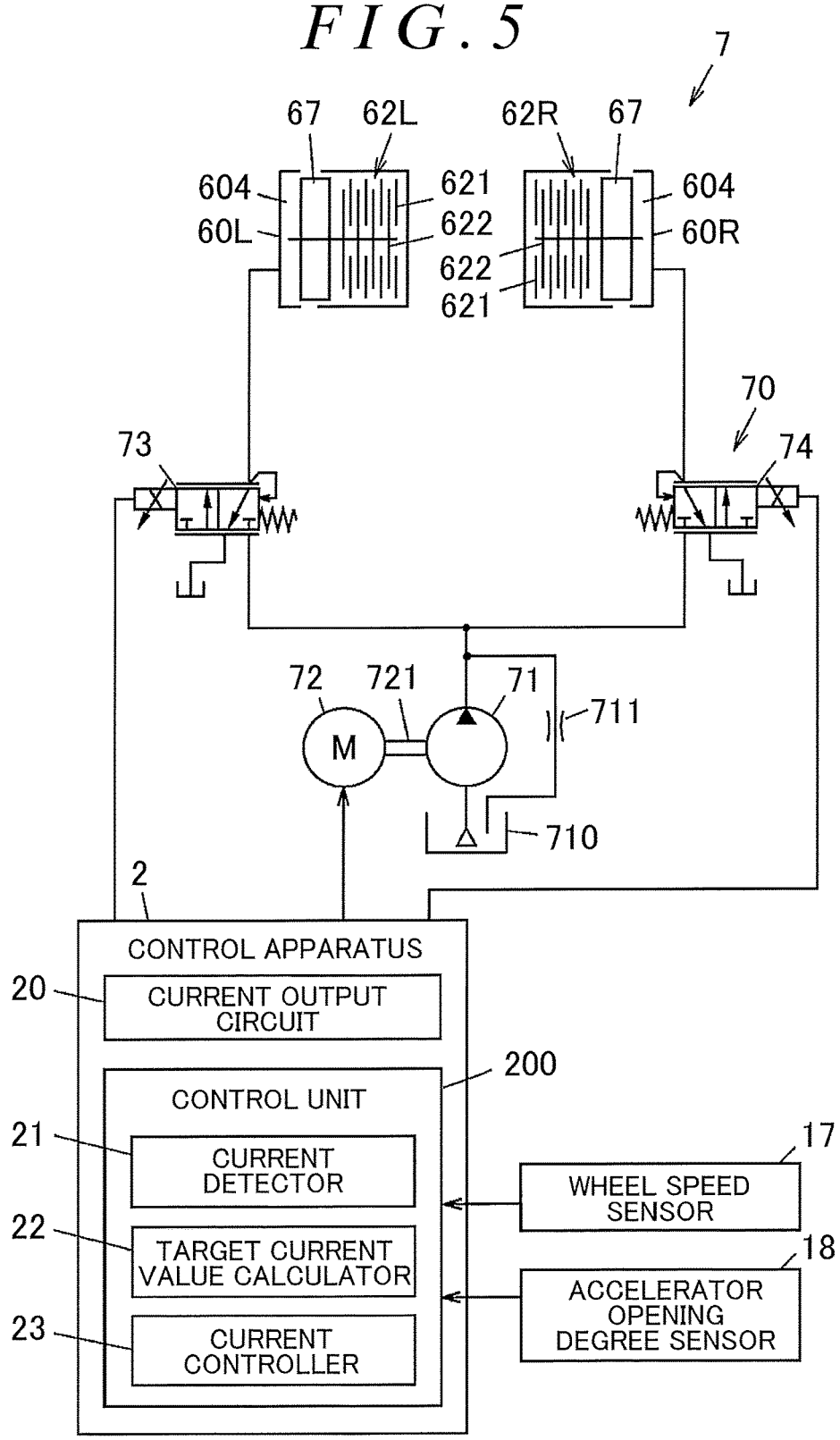
FIG. 5 is a structural diagram schematically illustrating an example of the structures of a hydraulic circuit and a control apparatus.

FIG. 5 is a structural diagram schematically illustrating an example of the structures of the hydraulic circuit 70 and the control apparatus 2. The hydraulic circuit 70 includes a hydraulic pump 71 serving as a hydraulic pressure source, an electric motor 72 configured to drive the hydraulic pump 71, and first and second solenoid valves 73 and 74. The hydraulic pump 71 and the electric motor 72 are coupled to each other by a coupling shaft 721. The control apparatus 2 supplies a motor current to the electric motor 72, and the electric motor 72 drives the hydraulic pump 71.

A speed reducer may be provided between the coupling shaft 721 and the electric motor 72. The speed reducer reduces the speed of rotation of the electric motor 72 at a predetermined speed reducing ratio. The electric motor 72 is, for example, a brushless DC motor, but a brushed DC motor may be used as the electric motor 72.

The hydraulic pump 71 itself is a well-known hydraulic pump, and discharges hydraulic oil pumped up from a reservoir 710 at a discharge pressure in accordance with the number of revolutions (rotation speed) of the electric motor 72. An orifice 711 is arranged between a discharge side of the hydraulic pump 71 and the reservoir 710. An external gear pump, an internal gear pump, or a vane pump may be used as a specific example of the hydraulic pump 71.

The first solenoid valve 73 is arranged in an oil path ranging from the hydraulic pump 71 to the cylinder chamber 604 of the side housing member 60L. The second solenoid valve 74 is arranged in an oil path ranging from the hydraulic pump 71 to the cylinder chamber 604 of the side housing member 60R. Each of the first and second solenoid valves 73 and 74 is a pressure control valve configured to regulate the pressure of the hydraulic oil to be supplied from the hydraulic pump 71 to the cylinder chamber 604. More specifically, each of the first and second solenoid valves 73 and 74 is an electromagnetic proportional pressure control valve. The pressure of the hydraulic oil to be output from the hydraulic circuit 70 to the cylinder chamber 604 changes in accordance with a current supplied from the control apparatus 2 to each of the first and second solenoid valves 73 and 74. Each of the first and second solenoid valves 73 and 74 includes an electromagnetic solenoid (not illustrated), and the current is supplied from the control apparatus 2 to a coil of the electromagnetic solenoid, thereby moving a valve element. A term "control current" is hereinafter used to represent the current to be supplied from the control apparatus 2 in order to regulate the pressure of the hydraulic oil to be supplied to the cylinder chamber 604.

Each of the first and second solenoid valves 73 and 74 drains a part of the hydraulic oil discharged from the hydraulic pump 71 to reduce the pressure of the hydraulic oil, and outputs the pressure toward the cylinder chamber 604. The pressure of the hydraulic oil to be output from each of the first and second solenoid valves 73 and 74 toward the cylinder chamber 604 changes in proportion to, for example, the control current. The control apparatus 2 controls the electric motor 72 so that the discharge pressure of the hydraulic pump 71 is higher than the hydraulic pressure of the hydraulic oil to be supplied to each of the cylinder chambers 604 of the side housing members 60R and 60L.

The hydraulic pump 71, the electric motor 72, the first and second solenoid valves 73 and 74, and the pistons 67 constitute a pressing mechanism 7 configured to press the outer clutch plates 621 and the inner clutch plates 622 of the first and second friction clutches 62R and 62L in the axial direction by pressing forces in accordance with the control currents supplied from the control apparatus 2. In this embodiment, the control apparatus 2 supplies the control currents to the first and second solenoid valves 73 and 74 of the pressing mechanism 7, thereby regulating the pressing forces to be applied to the first and second friction clutches 62R and 62L.

The control apparatus 2 includes a current output circuit 20 and a control unit 200. The current output circuit 20 outputs the control current to the pressing mechanism 7. The control unit 200 includes a current detector 21 configured to output a detection signal in accordance with the magnitude of the control current that is actually output from the current output circuit 20, target current value calculator 22 configured to calculate a target current value that is a target value of the control current to be supplied to the pressing mechanism 7, and a current controller 23 configured to control the current output circuit 20 so that the control current having the current value calculated by the target current value calculator 22 based on a result of detection performed by the current detector 21 is output to the pressing mechanism 7. The target current value calculator 22 calculates the target current value of the control current based on detection values from a wheel speed sensor 17 configured to detect the rotation speed of each of the front wheels 13R and 13L and the rear wheels 14R and 14L and from an accelerator opening degree sensor 18 configured to detect a depression amount of an accelerator pedal that is depressed by a driver.

Figure 6:
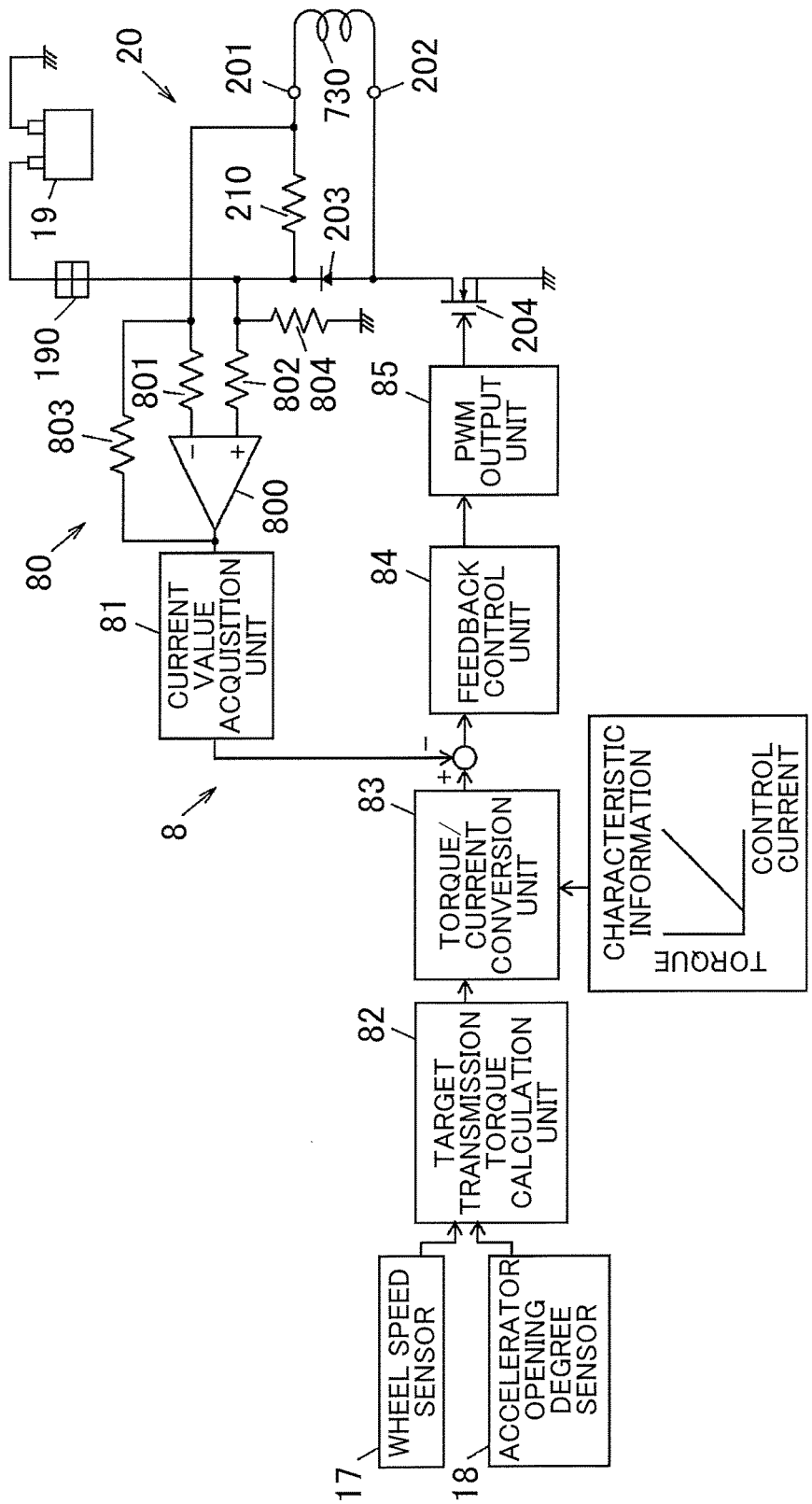
FIG. 6 is a block diagram illustrating an example of the structure of a control system implemented by a control unit together with an example of the structure of a current output circuit.

FIG. 6 is a block diagram illustrating an example of the structure of a control system 8 implemented by the control unit 200 together with an example of the structure of the current output circuit 20. The current output circuit 20 is capable of independently outputting the control currents to the first solenoid valve 73 and the second solenoid valve 74, and the current detector 21 is capable of detecting current values (actual current values) of the control currents that are actually output to the first solenoid valve 73 and the second solenoid valve 74. FIG. 6 illustrates only a circuit portion of the current output circuit 20 that outputs the control current to the first solenoid valve 73. A circuit portion for outputting and detecting the control current to the second solenoid valve 74 has a similar structure.

The current output circuit 20 includes a connector 190, a first terminal 201, a second terminal 202, a flyback diode 203, and a switching element 204. The connector 190 is supplied with a current from a DC power supply (battery) 19 mounted on the four-wheel drive vehicle 1. The first terminal 201 and the second terminal 202 are electrically connected to one end and the other end of a coil 730 of the electromagnetic solenoid of the first solenoid valve 73. The flyback diode 203 is connected between the first terminal 201 and the second terminal 202. The switching element 204 is, for example, a transistor or an FET. FIG. 6 illustrates a circuit example in which the FET is used as the switching element 204.

A shunt resistor 210 is connected between the connector 190 and the first terminal 201. The shunt resistor 210 detects a current output to the first solenoid valve 73. The current value of the current flowing through the shunt resistor 210 is equal to the current value of the current (control current) flowing through the coil 730. When the switching element 204 is turned ON, the current supplied from the battery 19 flows through the coil 730 via the connector 190 and the shunt resistor 210. When the switching element 204 is turned OFF, a current transiently flows via the flyback diode 203 due to an inductance of the coil 730.

The functions of the target current value calculator 22 and the current controller 23 of the control unit 200 are implemented, for example, such that a CPU of the control apparatus 2 executes a program stored in a storage element. Those functions may be implemented by hardware.

The control system 8 includes, as control elements, an amplifier circuit 80 and a current value acquisition unit 81 implemented by the current detector 21, a target transmission torque calculation unit 82 and a torque/current conversion unit 83 implemented by the target current value calculator 22, and a feedback control unit 84 and a PWM output unit 85 implemented by the current controller 23.

The amplifier circuit 80 includes an operational amplifier 800, a first resistor 801 connected between a negative (−) input terminal of the operational amplifier 800 and one end of the shunt resistor 210, a second resistor 802 connected between a positive (+) input terminal of the operational amplifier 800 and the other end of the shunt resistor 210, a third resistor 803 connected between an output terminal of the operational amplifier 800 and the one end of the shunt resistor 210, and a fourth resistor 804 connected between the other end of the shunt resistor 210 and a ground potential. The amplifier circuit 80 amplifies and outputs a potential difference generated by a voltage drop between the two ends of the shunt resistor 210.

The current value acquisition unit 81 samples an output voltage of the amplifier circuit 80, and performs AD conversion for converting an analog signal to a digital signal. The current value acquisition unit 81 outputs, as a detection signal, the signal that is obtained as a result of the AD conversion and indicates an actual current value of the control current.

Detection values are input front the wheel speed sensor 17 and the accelerator opening degree sensor 18 to the target transmission torque calculation unit 82. The target transmission torque calculation unit 82 calculates driving forces (target transmission torques) to be transmitted to the rear wheels 14R and 14L so that the driving forces are greater as a rotation speed difference between the front and rear wheels is larger or as the depression amount of the accelerator pedal (accelerator opening degree) is larger. The rotation speed difference between the front and rear wheels is a difference between an average rotation speed of the front wheels 13R and 13L and an average rotation speed of the rear wheels 14R and 14L. When the four-wheel drive vehicle 1 makes a turn, the target transmission torques for the rear wheels 14R and 14L are regulated so that a greater driving force is transmitted to one of the rear wheels 14R and 14L that is located on an outer side during the turn than the other one of the rear wheels 14R and 14L that is located on an inner side during the turn. Thus, the turn of the four-wheel drive vehicle 1 can be stabilized.

When there is no need to transmit the driving forces to the rear wheels 14R and 14L, the target transmission torque calculation unit 82 sets the target transmission torques to zero, so that the driving force transmission system 10 is switched to the disconnected mode. At this time, the control apparatus 2 controls the first driving force transmission apparatus 4 to interrupt the transmission of the driving forces. The target transmission torques calculated by the target transmission torque calculation unit 82 are input to the torque/current conversion unit 83.

The torque/current conversion unit 83 calculates, based on the target transmission torques, a target current value of the control current to be output to the pressing mechanism 7 by referring to characteristic information stored in advance. The characteristic information is information indicating a relationship between the control current to be supplied to the pressing mechanism 7 (specifically, the first and second solenoid valves 73 and 74) and the torques (driving forces) to be transmitted to the drive shafts 16R and 16L by the first and second friction clutches 62R and 62L, respectively.

Based on a difference between the target current value calculated by the torque/current conversion unit 83 and the actual current value of the control current output from the current value acquisition unit 81, the feedback control unit 84 performs feedback control so that the actual current value is closer to the target current value. Specifically, the feedback control unit 84 calculates a duty ratio indicating a ratio of time during which the switching element 204 is ON. The feedback control unit 84 performs PID control as a specific example of the feedback control. The PID control is a type of feedback control, in which a control target is controlled so that an actual value is closer to a target value based on three factors that are a deviation between the target value and the actual value, an integral value of the deviation, and a differential value of the deviation.

The PWM output unit 85 outputs a gate signal to the switching element 204 so that the switching element 204 is turned ON at the duty ratio calculated by the feedback control unit 84.

According to the control system constructed as described above, the driving forces corresponding to the target transmission torques calculated based on the detection values from the wheel speed sensor 17 and the accelerator opening degree sensor 18 are transmitted to the rear wheels 14R and 14L. By independently outputting the control currents to the first solenoid valve 73 and the second solenoid valve 74, the turn of the four-wheel drive vehicle 1 can be stabilized even when the four-wheel drive vehicle 1 travels on a low μ road such as a wet road.

Next, details of processing to be performed by the current controller 23 as the feedback control unit 84 are described with reference to FIG. 7.

Figure 7:
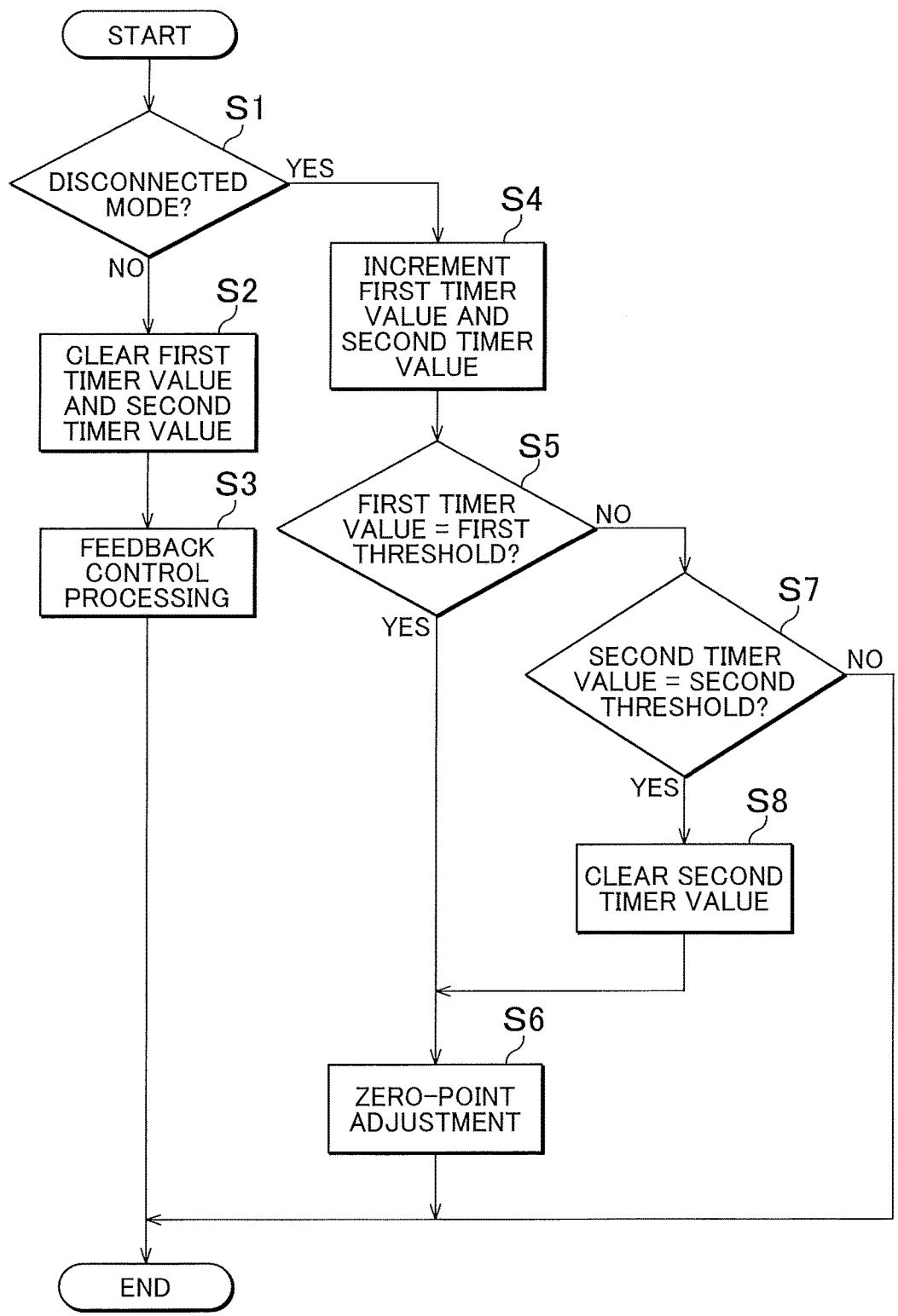
FIG. 7 is a flowchart illustrating a procedure of processing to be performed by a current controller as a feedback control unit.

FIG. 7 is a flowchart illustrating a procedure of the processing to be performed by the current controller 23 as the feedback control unit 84. The current controller 23 performs a series of processing steps illustrated in FIG. 7 in every predetermined control period (for example, 5 ms). At predetermined timings based on timer values (first timer value and second timer value) of a first timer and a second timer, the current controller 23 performs zero-point adjustment for storing information that the detection signal output from the current detector 21 indicates a zero point of the control current to be output from the current output circuit 20. In the following description, a term "clear" means that the timer value is set to zero, and a term "increment" means that a value of 1 is added to the timer value.

The zero-point adjustment is performed so as to increase the accuracy of the control current to be output from the control apparatus 2 in order to control each of the first and second friction clutches 62R and 62L, thereby controlling the driving force to be transmitted to each of the rear wheels 14R and 14L with high accuracy. More specifically, the current controller 23 performs the zero-point adjustment so as to suppress fluctuation of the detection signal to be output from the current value acquisition unit 81 due to, for example, a temperature rise of the control apparatus 2 (temperature drift).

The temperature drift is caused by, for example, a change in resistance of the shunt resistor 210 or the first to fourth resistors 801 to 804 or a change in characteristics of the operational amplifier 800 or the AD converter of the current value acquisition unit 81 due to the temperature rise. The temperature drift causes an error in the detection signal output from the current detector 21. Therefore, the current detector 21 may output, for example, a detection signal indicating that the control current is output even though the control current is not actually output to the pressing mechanism 7. Such an error causes an increase in the difference between the driving force that is actually transmitted to each of the rear wheels 14R and 14L and the target transmission torque. As a result, there is a possibility that desired traveling performance cannot be obtained.

In the processing of the flowchart illustrated in FIG. 7, the current controller 23 first determines whether the driving force transmission system 10 is in the disconnected mode (Step S1). The determination can be made based on, for example, whether the target transmission torque calculated by the target transmission torque calculation unit 82 is zero.

When the driving force transmission system 10 is not in the disconnected mode (Step S1: NO), the current controller 23 clears the first timer value and the second timer value (Step S2), and then performs the above-mentioned feedback control processing as the feedback control unit 84 (Step S3). Then, the current controller 23 terminates the processing in one control period.

When the driving force transmission system 10 is in the disconnected mode (Step S1: Yes), the current controller 23 increments both of the first timer value and the second timer value (Step S4). Next, the current controller 23 determines whether the first timer value is equal to a first threshold (Step S5). The first threshold is, for example, a value corresponding to 100 ms (when the control period is 5 ms, the value is 20(=100/5)). When the first timer value is equal to the first threshold (Step S5: Yes), the current controller 23 performs the zero-point adjustment (Step S6), and terminates the processing in one control period.

When the first timer value is not equal to the first threshold (Step S5: No), the current controller 23 determines whether the second timer value is equal to a second threshold (Step S7). When the second timer value is equal to the second threshold as a result of the determination (Step S7: Yes), the current controller 23 clears the second timer value (Step S8), performs the zero-point adjustment (Step S6), and terminates the processing in one control period. When the second timer value is not equal to the second threshold (Step S7: No), the current controller 23 terminates the processing in one control period without performing the processing of Step S8 and Step S6. The second threshold is, for example, a value corresponding to 5 seconds (when the control period is 5 ms, the value is 1000(=5000/5)).

Specifically, the zero-point adjustment in Step S6 is processing of storing information that, in the disconnected mode, the value of the detection signal output from the current detector 21 indicates the zero point of the control current to be output from the current output circuit 20. After the processing, the current controller 23 subtracts the stored value from the value of the detection signal output from the current detector 21, and performs the feedback control processing in Step S3.

In this embodiment, the zero-point adjustment is performed when a first predetermined time specified by the first threshold has elapsed since the driving force transmission system 10 is switched to the disconnected mode. When the disconnected mode continues afterwards, the zero-point adjustment is repeatedly performed every time a second predetermined time specified by the second threshold has elapsed. The second predetermined time is longer than the first predetermined time.

In this embodiment, the following processing is performed as well as the processing of the flowchart illustrated in FIG. 7. When a starter switch (for example, an ignition switch) for starting the engine 11 is turned ON, the zero-point adjustment is performed before the control current is output from the current output circuit 20 to the pressing mechanism 7. This processing is performed so as to control the driving force to be transmitted to each of the rear wheels 14R and 14L with high accuracy even when, for example, the starter switch is turned ON in a state in which the temperature of the control apparatus 2 is high and the four-wheel drive vehicle 1 is in the four-wheel drive mode immediately after the start of the engine 11 because the four-wheel drive mode is selected through a driver's switching operation. Examples of the case where the starter switch is turned ON in a state in which the temperature of the control apparatus 2 is high include a case where the starter switch is temporarily turned OFF after a long period of traveling and then the four-wheel drive vehicle 1 restarts after a short period of parking.

According to the first embodiment described above, the zero-point adjustment processing is performed at predetermined time intervals. Therefore, it is possible to increase the accuracy of the control current to be output from the control apparatus 2 in order to control each of the first and second friction clutches 62R and 62L. Accordingly, it is possible to control the driving force to be transmitted to each of the rear wheels 14R and 14L with high accuracy.

According to the first embodiment, the zero-point adjustment is performed in the disconnected mode when the first predetermined time shorter than the second predetermined time has elapsed. Therefore, the zero-point adjustment is performed at least once even when the disconnected mode continues only for a short period of time. When the disconnected mode continues afterwards, the zero-point adjustment is repeatedly performed every time the second predetermined time longer than the first predetermined time has elapsed. Therefore, even after the temperature of the control apparatus 2 fluctuates during the traveling in the detected mode, the accuracy of the control current when the four-wheel drive vehicle 1 is switched to the four-wheel drive mode can be increased while suppressing an increase in a calculation load on the CPU of the control apparatus 2.

Figure 8:
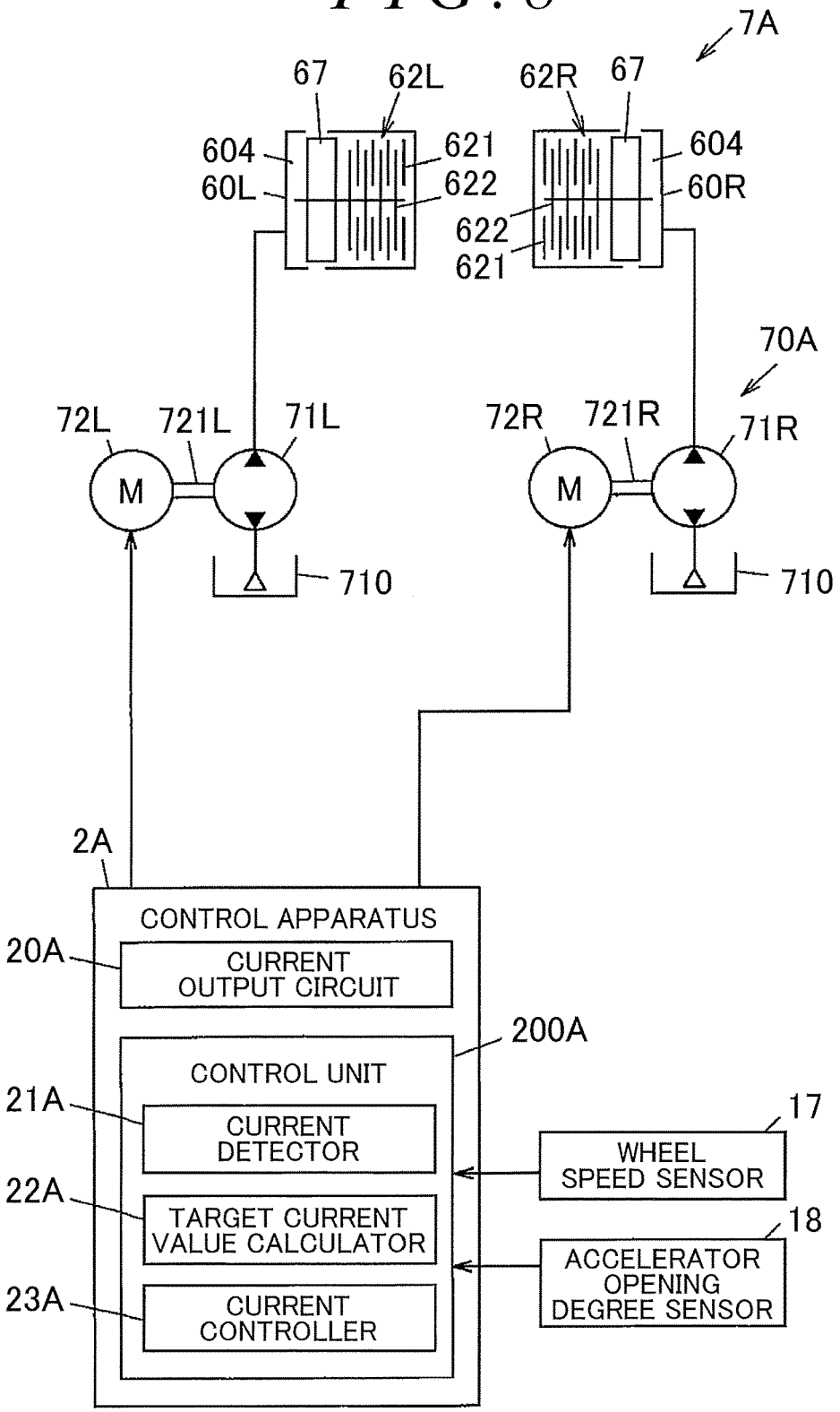
FIG. 8 is a structural diagram schematically illustrating an example of the structures of a hydraulic circuit and a control apparatus according to a second embodiment.

Next, a second embodiment of the present invention is described with reference to FIG. 8. FIG. 8 is a structural diagram schematically illustrating an example of the structures of a hydraulic circuit 70A and a control apparatus 2A according to the second embodiment. In FIG. 8, constituent elements in common those described in the first embodiment are represented by the same reference symbols as those in FIG. 7 or the like to omit redundant description.

The hydraulic circuit 70A according to this embodiment includes first and second hydraulic pumps 71R and 71L, and first and second electric motors 72R and 72L configured to drive the first and second hydraulic pumps 71R and 71L, respectively. The first electric motor 72R is coupled to the first hydraulic pump 71R by a first coupling shaft 721R, and is capable of rotating the first hydraulic pump 71R in forward and reverse directions. Similarly, the second electric motor 72L is coupled to the second hydraulic pump 71L by a second coupling shaft 721L, and is capable of rotating the second hydraulic pump 71L in forward and reverse directions.

The first and second hydraulic pumps 71R and 71L, the first and second electric motors 72R and 72L, and the right and left pistons 67 constitute a pressing mechanism 7A configured to press the outer clutch plates 621 and the inner clutch plates 622 of the first and second friction clutches 62R and 62L in the axial direction. The piston 67 presses the outer clutch plates 621 and the inner clutch plates 622 by receiving the hydraulic pressure of the hydraulic oil supplied to the cylinder chamber 604.

The control apparatus 2A according to this embodiment includes a current output circuit 20A and a control unit 200A. The current output circuit 20A outputs motor currents serving as the control currents to the first and second electric motors 72R and 72L of the pressing mechanism 7A. The control unit 200A includes a current detector 21A, a target current value calculator 22A, and a current controller 23A.

When the driving forces are transmitted to the rear wheels 14R and 14L via the first and second friction clutches 62R and 62L, respectively, the first and second electric motors 72R and 72L generate torques in accordance with the motor currents output from the current output circuit 20A, thereby rotating the first and second hydraulic pumps 71R and 71L in the forward direction. The first and second hydraulic pumps 71R and 71L supply, toward the cylinder chambers 604, streams of hydraulic oil having pressures in accordance with the torques generated by the first and second electric motors 72R and 72L, respectively.

When the driving force transmission system 10 is switched to the disconnected mode, the first and second electric motors 72R and 72L rotate the first and second hydraulic pumps 71R and 71L in the reverse direction to reduce the pressures in the cylinder chambers 604, respectively. Each of the first and second hydraulic pumps 71R and 71L pumps up the hydraulic oil from the reservoir 710 during the forward rotation, and discharges the hydraulic oil to the reservoir 710 during the reverse rotation.

In the control unit 200A, the current detector 21A detects the motor currents that are actually output to the first and second electric motors 72R and 72L. The target current value calculator 22A calculates target values (target current values) of the motor currents to be supplied to the first and second electric motors 72R and 72L based on detection values from the wheel speed sensor 17 and the accelerator opening degree sensor 18. The current controller 23A controls the current output circuit 20A so that the motor currents having the target current values calculated by the target current value calculator 22A through feedback control based on results of detection performed by the current detector 21A are output to the first and second electric motors 72R and 72L.

The current controller 23A performs processing similar to the processing of the flowchart described in the first embodiment with reference to FIG. 7. At predetermined timings based on timer values of the first timer and the second timer, the current controller 23A performs zero-point adjustment for storing information that the detection signal that is output from the current detector 21A and indicates the current value of the motor current indicates a zero point of the control current to be output from the current output circuit 20A.

The second embodiment described above attains actions and effects similar to those of the first embodiment.

Figure 9:
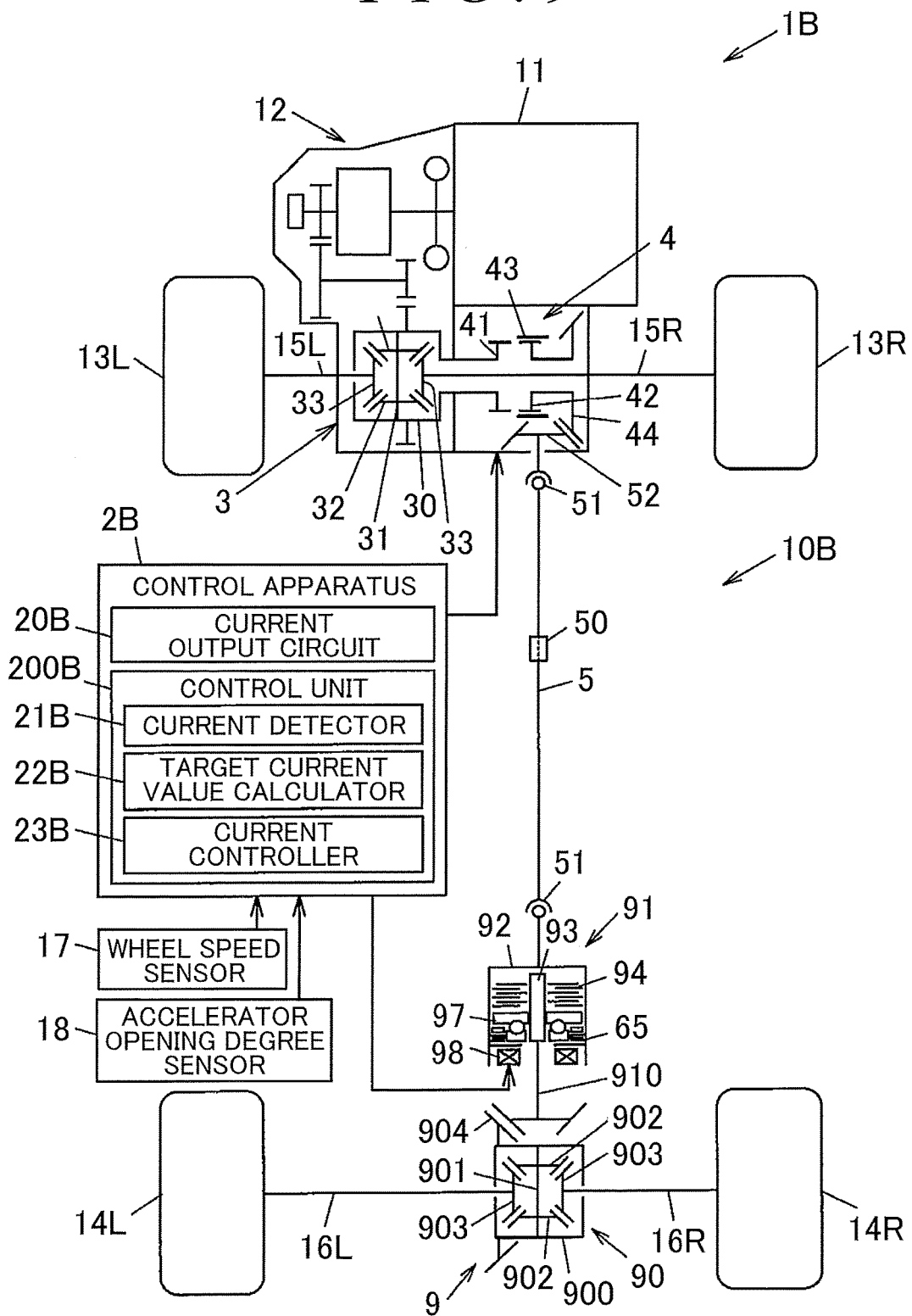
FIG. 9 is a structural diagram illustrating the schematic structure of a four-wheel drive vehicle according to a third embodiment of the present invention.
Figure 10:
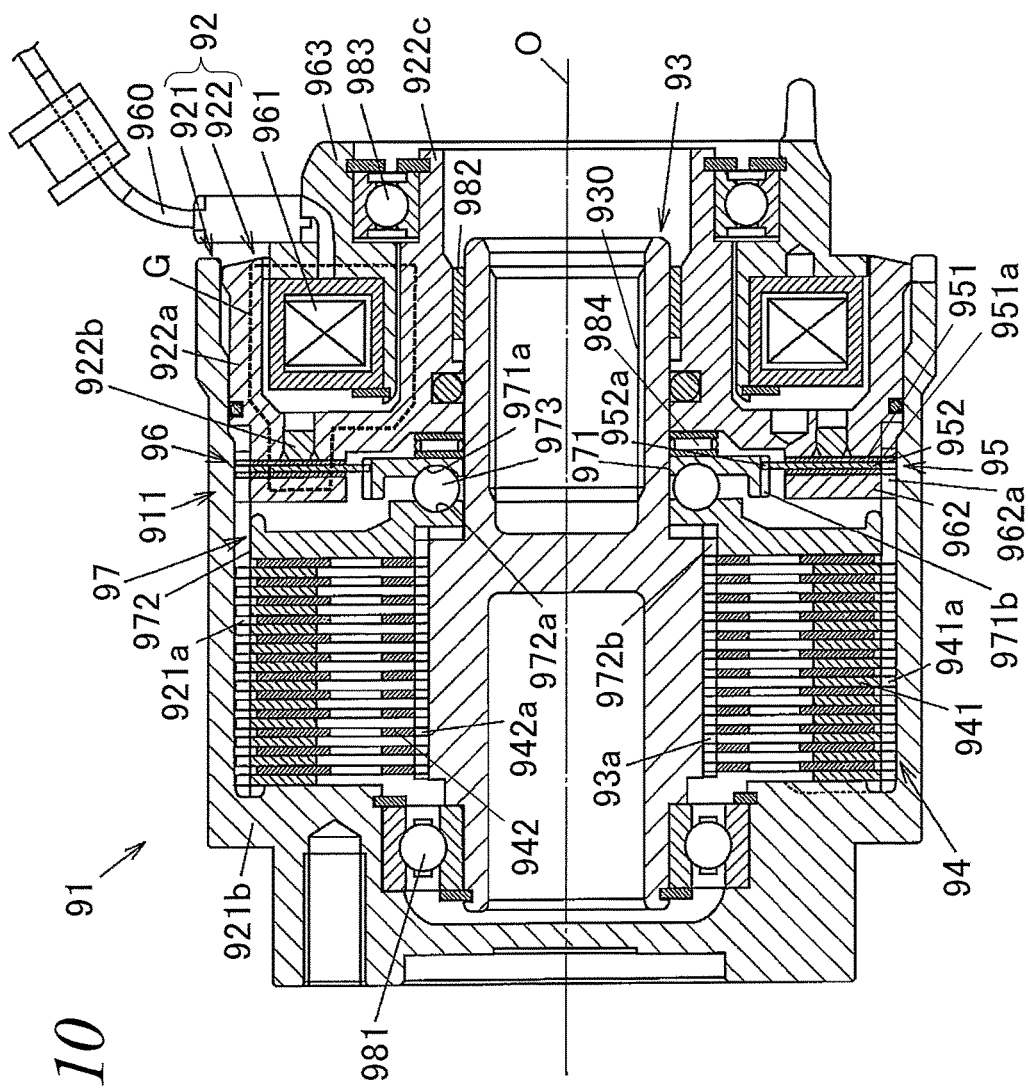
FIG. 10 is a sectional view illustrating an example of the structure of a clutch device of the second driving force transmission apparatus mounted on the four-wheel drive vehicle.

Next, a third embodiment of the present invention is described with reference to FIG. 9 and FIG. 10. FIG. 9 is a structural diagram illustrating the schematic structure of a four-wheel drive vehicle 1B according to the third embodiment of the present invention. A second driving force transmission apparatus 9 and a control apparatus 2B are mounted on the four-wheel drive vehicle 1B. The control apparatus 2B controls the first driving force transmission apparatus 4 and the second driving force transmission apparatus 9. FIG. 10 is a sectional view illustrating an example of the structure of a clutch device 91 of the second driving force transmission apparatus 9 mounted on the four-wheel drive vehicle 1B. In FIG. 9, constituent elements in common with those described in the first embodiment are represented by the same reference symbols as those in FIG. 1 or the like to omit redundant description.

The second driving force transmission apparatus 9 includes a differential device 90 and the clutch device 91 on the rear side. The differential device 90 and the clutch device 91 are coupled to each other by a pinion shaft 910. The clutch device 91 is capable of connecting and disconnecting the driving force to be transmitted to the differential device 90 via the pinion shaft 910. The differential device 90 distributes the transmitted driving force to the drive shafts 16R and 16L of the rear wheels 14R and 14L while allowing differential motion.

The differential device 90 includes a rear differential case 900, a pinion shaft 901 configured to rotate together with the rear differential case 900, a pair of pinion gears 902 rotatably supported by the pinion shaft 901, and a pair of side gears 903 meshing with the pinion gears 902 with their gear shafts set orthogonal to each other. The drive shells 16R and 16L are coupled to the side gears 903, respectively.

The clutch device 91 is roughly constituted by a clutch housing 92 serving as an outer rotational member that is coupled to the propeller shaft 5, an inner shaft 93 serving as an inner rotational member that is supported by the clutch housing 92 so as to be coaxially rotatable relative to the clutch housing 92, a main clutch 94 that is a multi-disc clutch configured to couple the clutch housing 92 and the inner shaft 93 to each other by receiving an axial pressing force so that the driving force is transmissible therebetween, a pilot clutch 95 arranged side by side with the main clutch 94 in its axial direction, an electromagnetic actuator 96 configured to cause the pilot clutch 95 to apply an axial pressing force, and a cam mechanism 97 configured to convert a torque of the clutch housing 92, which is transmitted by the pilot clutch 95, to a pressing force for the main clutch 94.

As illustrated in FIG. 10, the clutch housing 92 is constituted by a bottomed cylindrical front housing 921, and an annular rear housing 922 coupled to the front housing 921 by threadedly engaging with its open end so as to rotate together with the front housing 921. A plurality of spline teeth 921a are formed on the inner peripheral surface of the front housing 921 along a rotation axis O. The propeller shaft 5 is coupled to a bottom 921b of the front housing 921.

The rear housing 922 is constituted by a first member 922a coupled to the front housing 921 and formed of a soft magnetic material, a second member 922b coupled to an inner peripheral side of the first member 922a and formed of a non-magnetic material such as austenitic stainless steel, and a third member 922c coupled to an inner peripheral side of the second member 922b and formed of a soft magnetic material.

The inner shaft 93 is arranged on an inner side of the front housing 921, and is rotatably supported by a ball bearing 981 and a needle roller bearing 982. A plurality of spline teeth 93a are formed along the rotation axis O on the outer peripheral surface of the inner shaft 94 that is located closer to the bottom 921b of the front housing 921. A plurality of spline fitting portions 930 are formed on the inner peripheral surface of the inner shaft 93 at the end that is located opposite to the bottom 921b of the front housing 921. The spline fitting portions 930 couple one end of the pinion shaft 910 (see FIG. 9) to the inner shaft 93 so that the pinion shaft 910 and the inner shaft 93 are not rotatable relative to each other.

The main clutch 94 includes a plurality of outer main clutch plates 941 configured to rotate together with the front housing 921, and a plurality of inner main clutch plates 942 configured to rotate together with the inner shaft 93. The outer main clutch plates 941 have a plurality of engagement protrusions 941a engaging with the spline teeth 921a of the front housing 921, and are not rotatable but axially movable relative to the front housing 921. The inner main clutch plates 942 have a plurality of engagement protrusions 942a engaging with the spline teeth 93a of the inner shaft 93, and are not rotatable but axially movable relative to the inner shaft 93.

The pilot clutch 95 includes outer pilot chuck plates 951 and an inner pilot clutch plate 952 that are alternately arranged along the rotation axis O. The outer pilot clutch plates 951 have a plurality of engagement protrusions 951a engaging with the spline teeth 921a of the front housing 921, and engage with the front housing 921 so as not to be rotatable but axially movable relative to the front housing 921. The inner pilot clutch plate 952 has a plurality of engagement protrusions 952a engaging with a plurality of spline teeth 971b formed on the outer peripheral surface of a pilot cam 971 of the cam mechanism 97 described later, and engages with the pilot cam 971 so as not to be rotatable but axially movable relative to the pilot cam 971.

The electromagnetic actuator 96 includes an electromagnetic coil 961 and an armature 962. The electromagnetic coil 961 receives an exciting current from an electric cable 960. The electromagnetic coil 961 is arranged between the first member 922a and the third member 922c of the rear housing 922. The armature 962 is arranged at such a position as to sandwich the pilot clutch 95 between the armature 962 and a part of the rear housing 922 including the second member 922b. The electromagnetic coil 961 is retained by a yoke 963 that is supported by the third member 922c of the rear housing 922 via a ball bearing 983.

A plurality of engagement protrusions 962a are provided on the outer peripheral surface of the armature 962. The engagement protrusions 962a engage with the spline teeth 921a of the front housing 921. Thus, the armature 962 is not rotatable but axially movable relative to the front housing 921.

The outer pilot clutch plates 951 and the inner pilot clutch plate 952 are formed of a soft magnetic material such that a magnetic flux generated through energization of the electromagnetic coil 961 is allowed to pass. When the exciting current is supplied from the control apparatus 2B to the electromagnetic coil 961, a magnetic flux is generated in a magnetic path G passing through the yoke 963, the first member 922a and the third member 922c of the rear housing 922, the outer pilot clutch plates 951, the inner pilot clutch plate 952, and the armature 962. The armature 962 is attracted toward the rear housing 922 by a magnetic force of the magnetic flux.

The pilot clutch 95 is pressed through the axial movement of the armature 962, and the outer pilot clutch plates 951 and the inner pilot clutch plate 952 are brought into frictional contact with each other. Thus, a torque is transmitted from the front housing 921 to the pilot cam 971. The torque to be transmitted to the pilot cam 971 changes in accordance with the exciting current supplied to the electromagnetic coil 961.

The cam mechanism 97 includes the pilot cam 971 and a main cam 972 serving as a pair of cam members, and a plurality of cam balls 973 arranged between the pilot cam 971 and the main cam 972. The pilot cam 971 and the main cam 972 are arranged coaxially with the clutch housing 92 and the inner shaft 93. Relative rotation between the main cam 972 and the inner shaft 93 is restricted such that a plurality of engagement protrusions 972b formed on the inner peripheral surface of the main cam 972 engage with the spline teeth 93a of the inner shaft 93. A needle roller thrust bearing 984 is arranged between the pilot cam 971 and the third member 922c of the rear housing 922.

Cam grooves 971a are formed on the pilot cam 971 so that the cam balls 973 roll along the cam grooves 971a. Cam grooves 972a are formed on the main cam 972 so that the cam balls 973 roll along the cam grooves 972a. The cam grooves 971a and 972a of the pilot cam 971 and the main cam 972 extend along the circumferential direction in a predetermined angle range, and are formed so that the axial depth is largest at the center and is smaller toward the ends.

In the clutch device 91 constructed as described above, when the exciting current is supplied from the control apparatus 2B to the electromagnetic coil 961, the armature 962 is attracted toward the rear housing 922 by the magnetic force of the electromagnetic coil 961 to press the pilot clutch 95. Thus, the outer pilot clutch plates 951 and the inner pilot clutch plate 952 frictionally slide against each other, and therefore the rotational force of the front housing 921 is transmitted to the pilot cam 971 of the cam mechanism 97 via the pilot clutch 95. Accordingly, the pilot cam 971 rotates relative to the main cam 972.

When the cam balls 973 roll along the cam grooves 971a and 972a through the relative rotation between the pilot cam 971 and the main cam 972, an axial thrust generated in the main cam 972 so that the main cam 972 moves away from the pilot cam 971. The thrust of the cam mechanism 97 causes the main cam 972 to press the main clutch 94, and therefore a frictional force is generated between the outer main clutch plates 941 and the inner main clutch plates 942. Accordingly, the front housing 921 and the inner shaft 93 are coupled to each other so that the driving force is transmissible therebetween.

When the supply of the exciting current from the control apparatus 2B to the electromagnetic coil 961 is interrupted, the pilot clutch 95 is not pressed by the armature 962, and therefore the rotational force is not transmitted from the front housing 921 to the pilot cam 971 via the pilot clutch 95. Thus, the main clutch 94 is not pressed by the main cam 972. Accordingly, the driving force is not transmitted by the main clutch 94.

The pilot clutch 95, the electromagnetic actuator 96, and the cam mechanism 97 constitute a pressing mechanism 911 configured to press the outer main clutch plates 941 and the inner main clutch plates 942 of the main clutch 94 in the axial direction by the pressing force in accordance with the exciting current supplied from the control apparatus 2B. The exciting current supplied to the electromagnetic coil 961 is a control current output from the control apparatus 2B to the pressing mechanism 911 in order to regulate the driving force to be transmitted by the main clutch 94.

The control apparatus 2B includes a current output circuit 20B and a control unit 200B. The current output circuit 20B outputs the exciting current serving as the control current to the electromagnetic coil 961 of the electromagnetic actuator 96. The control unit 200B includes a current detector 21B configured to output a detection signal in accordance with the magnitude of the exciting current that is actually output from the current output circuit 20B, a target current value calculator 22B configured to calculate a target current value that is a target value of the exciting current to be supplied to the pressing mechanism 911, and a current controller 23B configured to control the current output circuit 20B so that the exciting current having the current value calculated by the target current value calculator 22B based on a result of detection performed by the current detector 21B is output to the pressing mechanism 911.

The current output circuit 20B is constructed similarly to the current output circuit 20 according to the first embodiment that is described with reference to FIG. 6, except that the exciting current serving as the control current is supplied to the electromagnetic coil 961. The current detector 21B, the target current value calculator 22B, and the current controller 23B perform respective types of processing similar to those of the current detector 21, the target current value calculator 22, and the current controller 23 that are described in the first embodiment. At predetermined timings based on timer values of the first timer and the second timer, the current controller 23B performs zero-point adjustment for storing information that the detection signal that is output from the current detector 21B and indicates the current value of the exciting current indicates a zero point of the control current to be output from the current output circuit 20B.

The third embodiment described above attains actions and effects similar to those of the first embodiment. An electric motor may be used as the electromagnetic actuator 96 configured to rotate the pilot cam 971 and the main cam 972 of the cam mechanism 97 relative to each other. In this case, the pilot cam 971 rotates relative to the main cam 972 by a torque of the electric motor, and the main cam 972 presses the main clutch 94 by a pressing force in accordance with a motor current. The control apparatus supplies the motor current serving as the control current to the electric motor. Further, an electromagnetic solenoid may be used as the electromagnetic actuator 96.

The present invention may be modified as appropriate without departing from the spirit or the present invention. The constituent elements of the respective embodiments may be combined as appropriate. For example, two clutch devices 91 according to the third embodiment may be used in place of the first and second friction clutches 62R and 62L of the second driving force transmission apparatus 6 according to the first embodiment. Further, the second driving force transmission apparatus in which the outer clutch plates and the inner clutch plates are pressed by the hydraulic pressure may be arranged between the differential device 90 on the rear side and the propeller shaft 5 as illustrated in FIG. 9. Alternatively, the arrangement of the clutch device 91 may be changed in the third embodiment. The clutch device 91 may be arranged between the differential device 90 and the drive shaft 16R or the drive shaft 16L.

What is claimed is:

1. A four-wheel drive vehicle, comprising:
   main driving wheels to which a driving force of a drive source is constantly transmitted;
   a driving shaft configured to transmit the driving force in a fore-and-aft direction of the vehicle;
   auxiliary driving wheels to which the driving force of the drive source is transmitted via the driving shaft;
   a first driving force transmission apparatus and a second driving force transmission apparatus arranged such that the driving shaft is interposed between the first driving force transmission apparatus and the second driving force transmission apparatus in a driving force transmission path to the auxiliary driving wheels; and
   a control apparatus configured to control the first driving force transmission apparatus and the second driving force transmission apparatus, wherein
   the first driving force transmission apparatus includes a dog clutch configured to transmit the driving force through engagement between projections and recesses,
   the second driving force transmission apparatus includes:
   an outer rotational member and an inner rotational member that are supported so as to be coaxially rotatable relative to each other;
   an outer clutch plate configured to rotate together with the outer rotational member;
   an inner clutch plate configured to rotate together with the inner rotational member; and a pressing mechanism configured to press the outer clutch plate and the inner clutch plate in an axial direction by a pressing force in accordance with a control current supplied from the control apparatus, the control apparatus includes:
- a current output circuit configured to output the control current to the pressing mechanism;
- a current detector configured to output a detection signal in accordance with a magnitude of the control current that is actually output from the current output circuit;
- a target current value calculator configured to calculate a target current value that is a target value of the control current to be supplied to the pressing mechanism; and
- a current controller configured to control the current output circuit so that the control current having the current value calculated by the target current value calculator based on a result of detection performed by the current detector is output to the pressing mechanism, and when the four-wheel drive vehicle is in a two-wheel drive mode in which transmission of the driving force that is performed by both of the first driving force transmission apparatus and the second driving force transmission apparatus is interrupted, the current controller is configured to perform zero-point adjustment for storing information that the detection signal output from the current detector indicates a zero point of the control current to be output from the current output circuit.

2. The four-wheel drive vehicle according to claim 1, wherein the current controller is configured to perform the zero-point adjustment when a first predetermined time has elapsed since the four wheel drive vehicle is switched to the two-wheel drive mode, and to repeatedly perform, when the two-wheel drive mode continues afterwards, the zero-point adjustment every time a second predetermined time longer than the first predetermined time has elapsed.

3. The four-wheel drive vehicle according to claim 1, wherein, when a starter switch for starting the drive source is turned ON, the current controller is configured to perform the zero-point adjustment before the control current is output from the current output circuit to the pressing mechanism.

4. The four-wheel drive vehicle according to claim 1, wherein
the pressing mechanism includes:
- a hydraulic pump;
- a piston configured to press the outer clutch plate and the inner clutch plate by receiving a hydraulic pressure of hydraulic oil supplied to a cylinder chamber; and
- a solenoid valve configured to regulate the pressure of the hydraulic oil to be supplied from the hydraulic pump to the cylinder chamber, and the control apparatus is configured to output the control current to the solenoid valve.

5. The four-wheel drive vehicle according to claim 1, wherein
the pressing mechanism includes:
- an electric motor;
- hydraulic pump to be driven by the electric motor; and
- a piston configured to press the outer clutch plate and the inner clutch plate by receiving a hydraulic pressure of hydraulic oil supplied from the hydraulic pump to a cylinder chamber, and the control apparatus is configured to output the control current to the electric motor.

6. The four-wheel drive vehicle according to claim 1, wherein
the pressing mechanism includes:
- a cam mechanism configured to generate the pressing force through relative rotation between a par of cam members arranged coaxially with the outer rotational member and the inner rotational member; and
- an electromagnetic actuator configured to rotate the pair of cam members relative to each other, and the control apparatus is configured to output the control current to the electromagnetic actuator.

7. A control apparatus to be mounted on a four-wheel drive vehicle including main driving wheels to which a driving force of a drive source is constantly transmitted, a driving shaft configured to transmit the driving force in a fore-and-aft direction of the vehicle, auxiliary driving wheels to which the driving force of the drive source is transmitted via the driving shaft, and a first driving force transmission apparatus and a second driving force transmission apparatus arranged such that the driving shaft is interposed between the first driving force transmission apparatus and the second driving force transmission apparatus in a driving force transmission path to the auxiliary driving wheels, the control apparatus comprising:
- a control unit; and
- a current output circuit, wherein the control apparatus is configured to control the first driving force transmission apparatus and the second driving force transmission apparatus, the first driving force transmission apparatus includes a dog clutch configured to transmit the driving force through engagement between projections and recesses, the second driving force transmission apparatus includes:
- an outer rotational member and an inner rotational member that are arrange so as to be coaxially rotatable relative to each other;
- a friction clutch including an outer clutch plate configured to rotate together with the outer rotational member, and an inner clutch plate configured to rotate together with the inner rotational member; and
- a pressing mechanism configured to press the outer clutch plate and the inner clutch plate in an axial direction by pressing force in accordance with a control current supplied from the current output circuit, the control unit includes:
- a target current value calculator configured to calculate a target current value that is a target value of the control current to be supplied to the pressing mechanism;
- a current detector configured to output a detection signal in accordance with a magnitude of the control current that is actually output from the current output circuit; and
- a current controller configured to control the current output circuit so that the control current having the current value calculated by the target current value calculator based on a result of detection performed by the current detector is output to the pressing mechanism, and when the four-wheel drive vehicle is in a two-wheel drive mode in which transmission of the driving force that is performed by both of the dog clutch and the friction clutch is interrupted, the current controller is configured to perform zero-point adjustment for storing information that the detection signal output from the current detector indicates a zero point of the control current to be output from the current output circuit.

* * * * *